United States Patent [19]
Fukunaga

[11] Patent Number: 5,417,315
[45] Date of Patent: May 23, 1995

[54] LUBRICATING FLUID REGULATOR IN TORQUE CONVERTOR HYDRAULIC CLUTCH

[75] Inventor: Takao Fukunaga, Neyagawa, Japan

[73] Assignee: Kabushiki Kaisha Daikin Seisakusho, Neyagawa, Japan

[21] Appl. No.: 87,931

[22] Filed: Jul. 6, 1993

[30] Foreign Application Priority Data

Jul. 6, 1992 [JP] Japan ................... 4-178070

[51] Int. Cl.⁶ ............................................ F16D 33/00
[52] U.S. Cl. ...................................... 192/3.3; 192/3.29
[58] Field of Search ...................... 192/3.29, 3.3, 3.33, 192/85 AA, 85.17

[56] References Cited

U.S. PATENT DOCUMENTS

| | | | |
|---|---|---|---|
| 4,257,509 | 2/1981 | Hiraiwa et al. | 192/86 |
| 4,781,279 | 11/1988 | Georg | 192/3.3 |
| 4,785,924 | 11/1988 | Jäckel | 192/3.29 |
| 4,828,084 | 5/1989 | Hasegawa et al. | 192/3.3 |
| 4,984,664 | 1/1991 | Sugano | 192/3.3 |
| 5,020,646 | 6/1991 | Koshimo | 192/3.25 |
| 5,145,045 | 9/1992 | Wakahara | 192/3.29 |
| 5,163,540 | 11/1992 | Mainquist et al. | 192/3.3 |
| 5,219,055 | 6/1993 | Imamura | 192/3.3 X |
| 5,251,734 | 10/1993 | Benford et al. | 192/3.3 |
| 5,305,862 | 4/1994 | Gierer | 192/3.3 |
| 5,315,901 | 5/1994 | Barnes | 192/3.3 |

FOREIGN PATENT DOCUMENTS 1950211 4/1971 Germany ................ 192/3.26

Primary Examiner—Andrea L. Pitts
Attorney, Agent, or Firm—Knobbe, Martens, Olson & Bear

[57] ABSTRACT

A directional control valve is composed of a cylinder and a spool located therein so as to be slidably shiftable. The cylinder is formed to have a first input port, a second input port and a control port to which hydraulic fluid is supplied from a fluid pump; a first output port for supplying hydraulic fluid for clutch operation to a power-disconnection clutch, and a second output port for supplying hydraulic fluid for lubrication to the clutch. Positioning of the spool is shiftable between a first position wherein the first input port and the first output port are communicated, and a second position wherein the second input port and the second output port are communicated, according to hydraulic pressure via the control port.

18 Claims, 6 Drawing Sheets

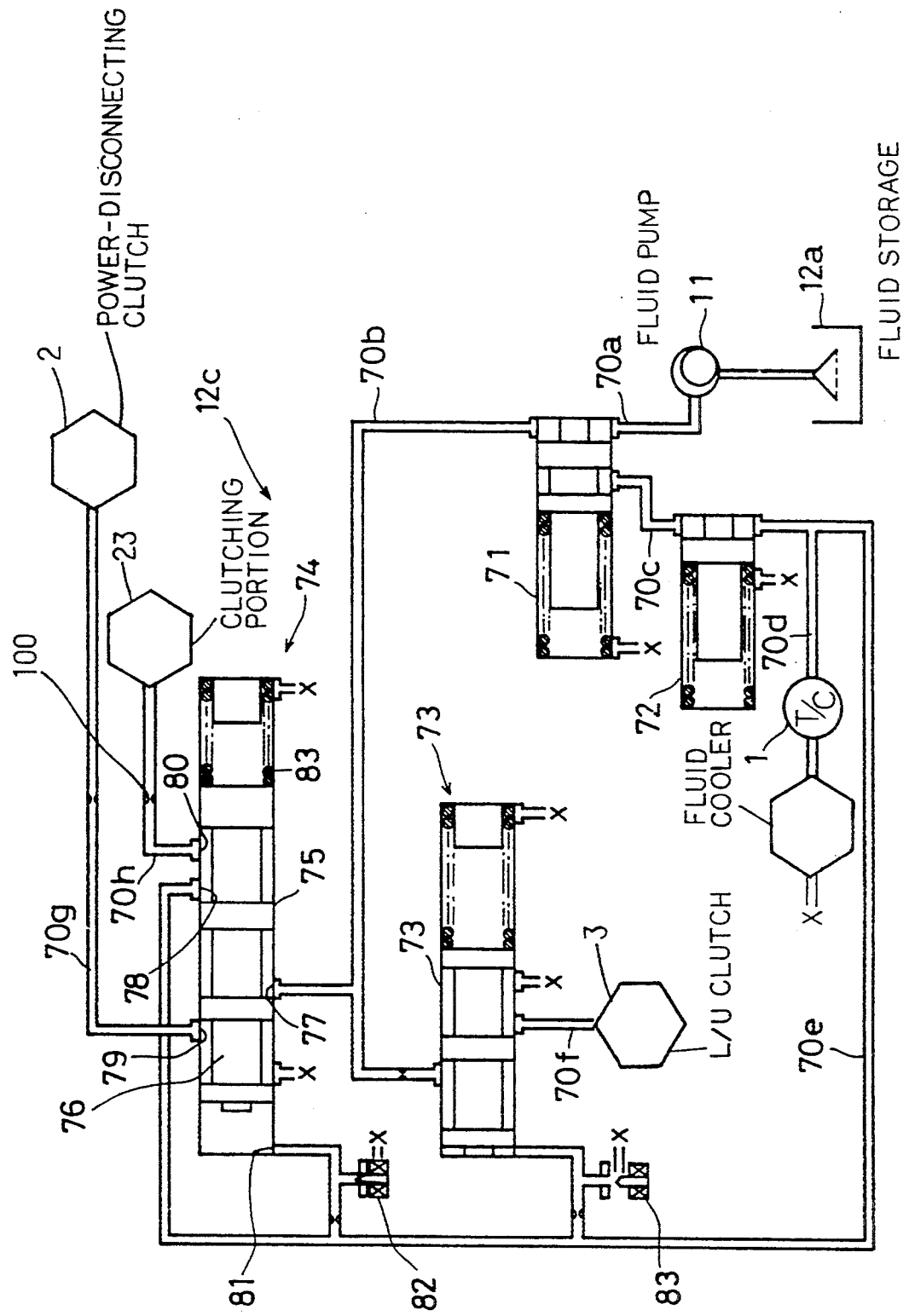

LUBRICATING FLUID REGULATOR IN TORQUE CONVERTOR HYDRAULIC CLUTCH

BACKGROUND OF THE INVENTION

The present invention relates to a directional control valve, particularly to a directional control valve which supplies hydraulic fluid from a fluid pump to a power-disconnecting hydraulic clutch of a torque convertor.

A torque convertor transmits power by means of hydraulic fluid. Wherein the torque convertor is installed in a vehicle together with a manual transmission, a power-disconnecting clutch is provided between the turbine of the torque convertor and the main drive shaft extending from the manual transmission. The power-disconnecting clutch engages and disengages a front cover joined to the torque convertor impeller and a power output member connected to the main drive shaft. The power-disconnecting clutch is activated by hydraulic fluid supplied by a hydraulic circuit. Fluid for lubrication of the clutch is also supplied by the hydraulic circuit.

In this kind of power disconnecting clutch, it is particularly necessary to supply lubrication fluid to the clutch wherein a plurality of mutually contacting clutch plates are employed. Japanese Patent Application Laying-Open No. 98757/1989 shows a clutch device structure in which when a piston begins to press a plurality of clutch plates under the agency of hydraulic fluid, the piston also presses washer-type springs located radially inward of the clutch device. As the washer-type springs are compressed, a lubrication-fluid supply opening, which is otherwise closed off by the washer-type springs, is opened, whereby lubrication fluid is supplied to the clutch plates.

Passages in the above-described clutch device through which the lubrication fluid passes are structurally complex, complicating the clutch manufacturing process. Moreover, due to error in the accuracy of assembling washer-type springs, uncertainly arises concerning supply of the lubrication fluid to the clutch plates during engagement.

SUMMARY OF THE INVENTION

It is an object of the present invention to surely supply lubricating fluid to a power disconnecting hydraulic clutch used in a torque convertor, by means of a simple structure.

A directional control valve according to an aspect of the present invention comprises a cylinder and a spool and is for supplying hydraulic fluid from a fluid pump to a power-disconnecting hydraulic clutch which connects and disconnects the torque convertor front cover and the power output member.

The cylinder is formed to have a fluid inlet comprising first and second input ports, and a control port, via which ports hydraulic fluid is supplied to the cylinder from the fluid pump; the cylinder also has a first output port for supplying hydraulic fluid for actuation to the hydraulic clutch, and a second output port for supplying hydraulic fluid for lubrication to the hydraulic clutch. The spool is disposed within the cylinder so as to be slidable. The spool is shiftable between a first position wherein the first input port is communicated with the first output port, and a second position wherein the second input port is communicated with the second output port, according to hydraulic pressure supplied to the control port.

When the spool is located in the second position, the hydraulic fluid is supplied from the second output port of directional control valve to the clutch plates of the hydraulic clutch. When the spool is switched to the first position, the hydraulic fluid is supplied from the first output port of the directional control valve to the hydraulic clutch so as to engage the clutch. Thus at clutch engagement, a sufficient amount of fluid for lubrication has already been supplied to the clutch plates of the hydraulic clutch.

Consequently, it is possible to ensure the supply of lubricating fluid to the hydraulic clutch, by means of a simple structure.

The foregoing and other objects, aspects and advantages of the present invention will become more apparent from the following detailed description.

BRIEF DESCRIPTION OF THE DRAWINGS

FIG. 6 is schematic diagram of a hydraulic circuit, illustrating a directional control valve wherein the spool is located in a second position.

DESCRIPTION OF THE PREFERRED EMBODIMENT

Structure

FIGS. 1 to 4 show a torque convertor according to one embodiment of the present invention, wherein a line 0—0 represents its rotational axis.

Figure 1:
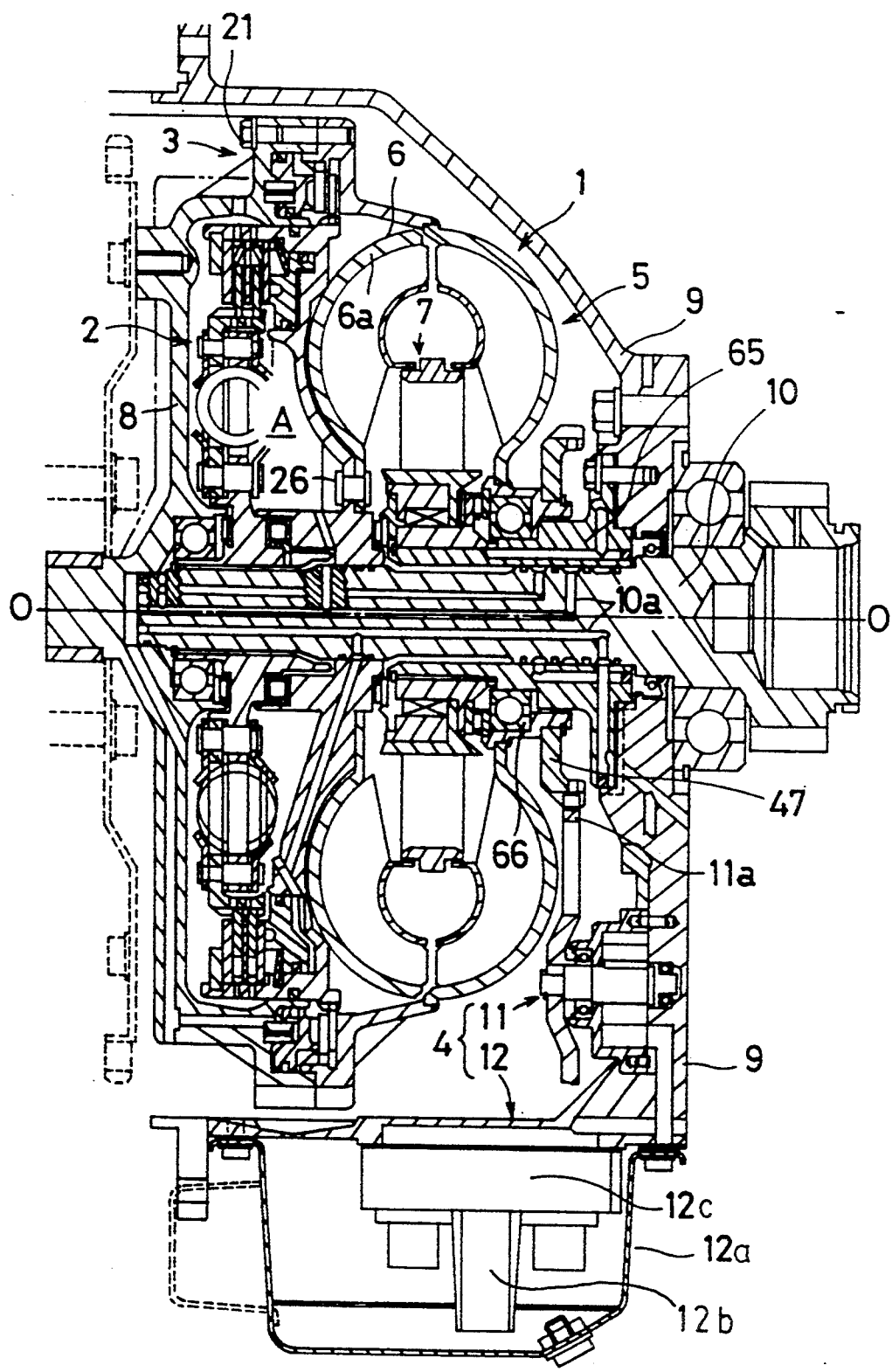
FIG. 1 is a vertical sectional view showing a torque convertor according to one embodiment of the present invention.

In FIG. 1, the torque convertor is mainly composed of a torque convertor body 1 comprising three types of vane wheels and having a toroidal shape, a power disconnecting clutch 2 for transmitting and disconnecting power from the torque convertor body 1 to and from a main drive shaft 10, and a lock-up clutch 3 for directly transmitting the power to the clutch 2. The torque convertor body 1 comprises an impeller 5, a turbine 6 disposed opposite to the impeller 5, and a stator 7 disposed between the radially inner portions of the impeller 5 and the turbine 6. A flange member 8g (as described later) welded to the radially outer portion of the impeller 5 is fixed to a front cover 8 by bolts 21 so that the impeller 5 is rotated integrally with the front cover 8. Torque is input to the front cover 8 from the engine side (the left side of FIG. 1). Further, a fluid supply part 4 for supplying hydraulic fluid for operation and lubrication to the power disconnecting clutch 2 and the lock-up clutch 3 is provided below the torque convertor body 1.

A housing 9 is so disposed as to cover the above described torque convertor and is fixed to a housing (not shown) on a manual transmission side (the right side of FIG. 1). The main drive shaft 10 connected to the manual transmission (not shown) is disposed in the center of the housing 9. A plurality of fluid passages 10a are provided in the main drive shaft 10. The hydraulic fluid for operation and lubrication are supplied to the entire torque convertor through the fluid passages 10a. An outer shaft 65 fixed to the housing 9 is fitted around the main drive shaft 10. The outer shaft 65 fixes an inner race of the stator 7 and rotatably supports the radially inner portion of the impeller 5 through a bearing 66.

The fluid supply part 4 comprises a fluid pump 11 fixed to the housing 9 and a fluid suction part 12. A driving gear 11a of the fluid pump 11 engages with a fluid pump gear 47 fixed to the impeller 5 and is driven as the impeller 5 is rotated. The fluid suction part 12 is provided below the torque convertor and comprises a tank 12a in which the hydraulic operating fluid and the lubricating fluid discharged from the torque convertor are stored and a suction part 12b for sucking the hydraulic fluid stored in the tank 12a. A control valve 12c for controlling the flow of the hydraulic fluid from the suction part 12b is disposed above the suction part 12b. This control valve 12c is fixed to the bottom of the housing 9. The hydraulic fluid stored in the tank 12a are sent to the control valve 12c from the suction part 12b by the fluid pump 11 and is supplied to respective portions of the torque convertor through the fluid passages 10a from the control valve 12c.

Figure 2:
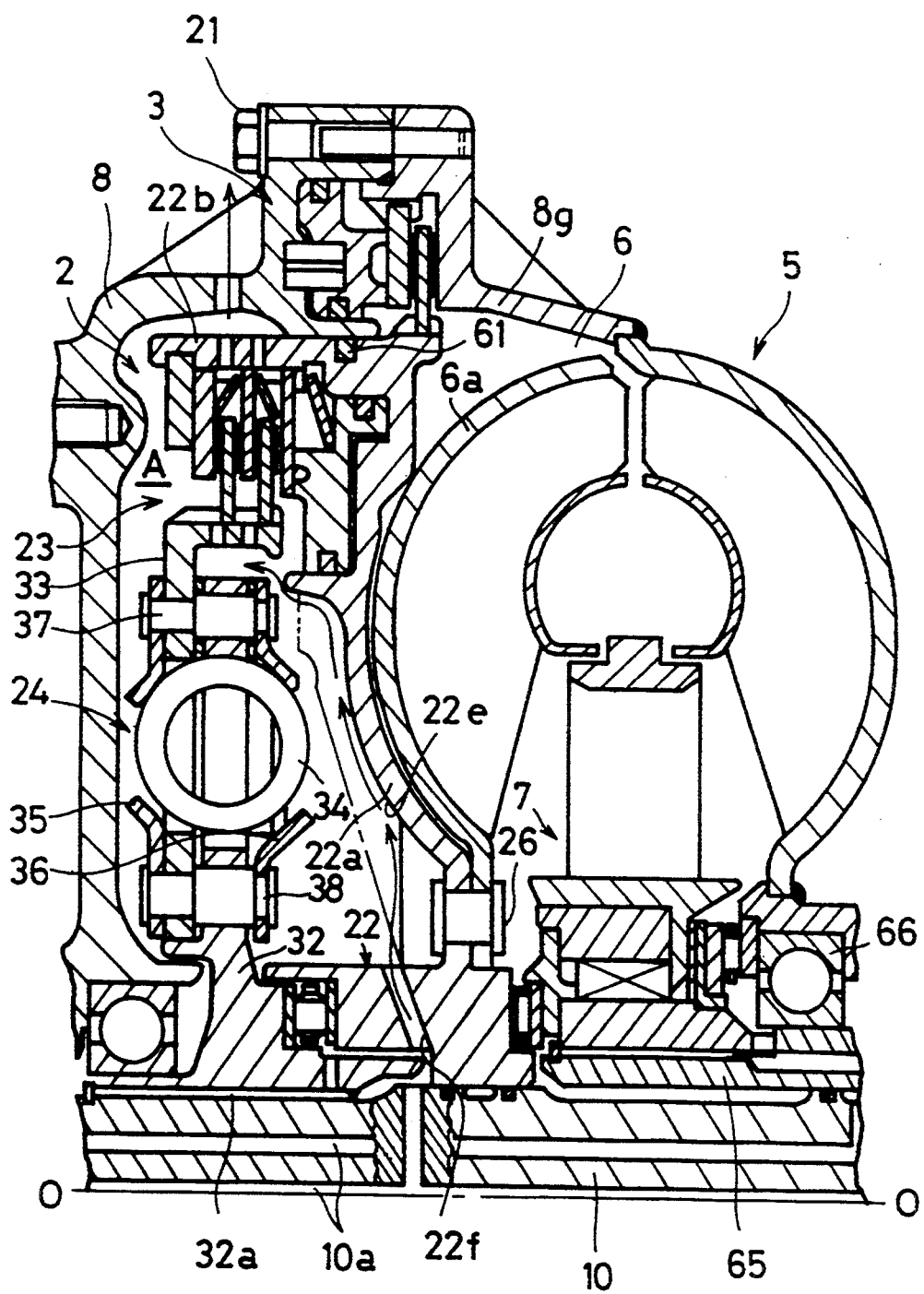
FIG. 2. is an enlarged partial view of FIG. 1.

The power disconnecting clutch 2 is disposed within space A formed between the torque convertor body 1 and the front cover 8. The power disconnecting clutch 2 is mainly composed of a hub 22, a clutching portion 23, a damper connecting part 24, as shown in FIG. 2.

Figure 3:
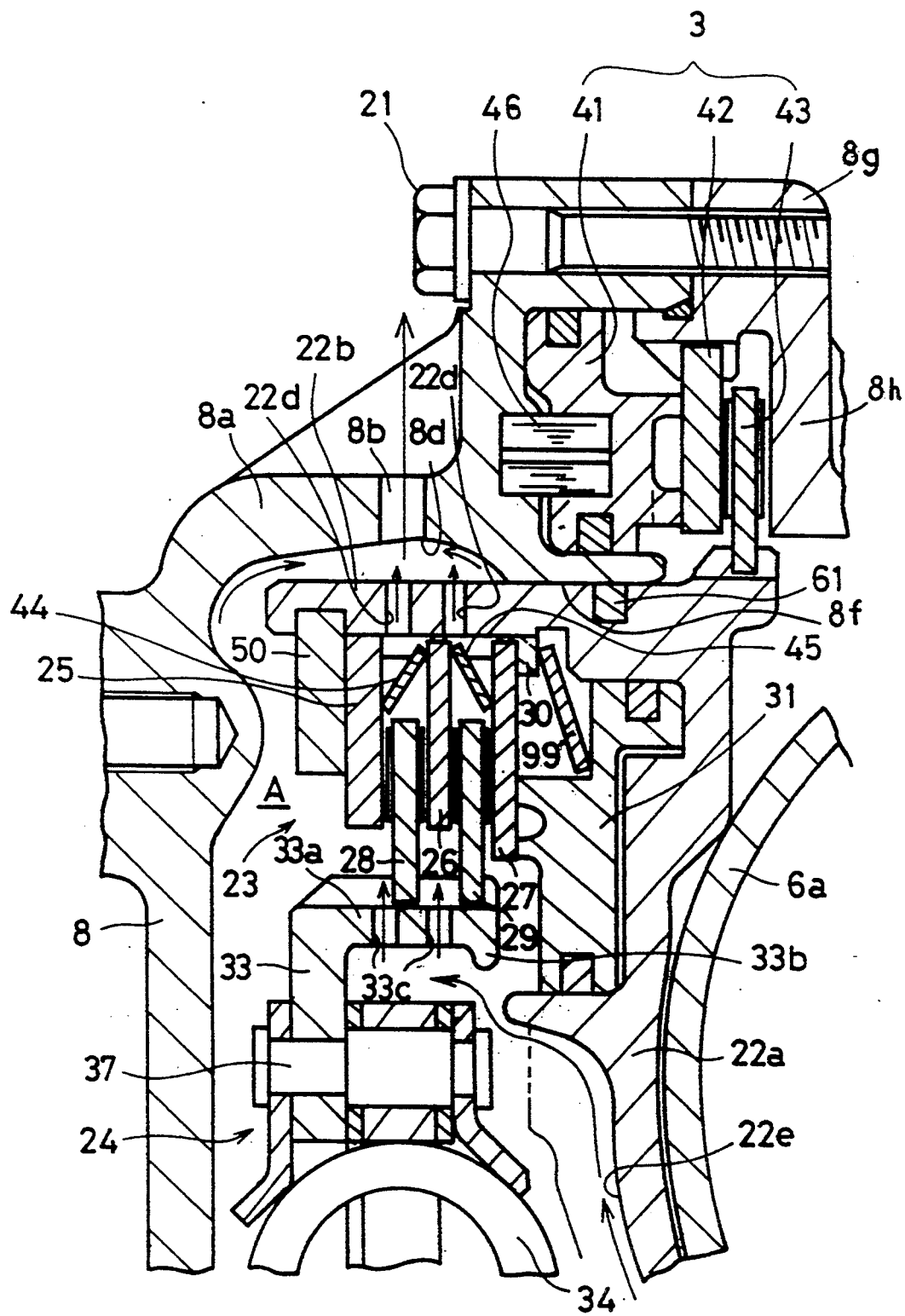
FIG. 3 is an enlarged partial view of FIG. 2.

The hub 22 is rotatably fitted onto the main drive shaft 10 and has holes 22f for supplying lubricating fluid to the space A from the fluid passages 10a. In addition, the hub 22 is integrally provided with a flange 22a extending radially outward. The radially inner portion of the flange 22a is fixed to a shell 6a of the turbine 6 by a plurality of rivet is 26. A cylindrical portion 22b extending toward the front cover 8 is integrally formed in the radially outer end of the flange 22a. As shown in FIG. 3, a seal ring 61 is disposed between the inner surface of an inner cylindrical wall 8f (as described later) provided in a cylindrical portion 8a of the front cover 8 and the outer surface of the cylindrical portion 8a. The space A is cut off from a space on the side of the torque convertor body 1 by the seal ring 61. As a result, hydraulic operating fluid in the torque convertor body 1 is prevented from entering the space A.

Figure 4:
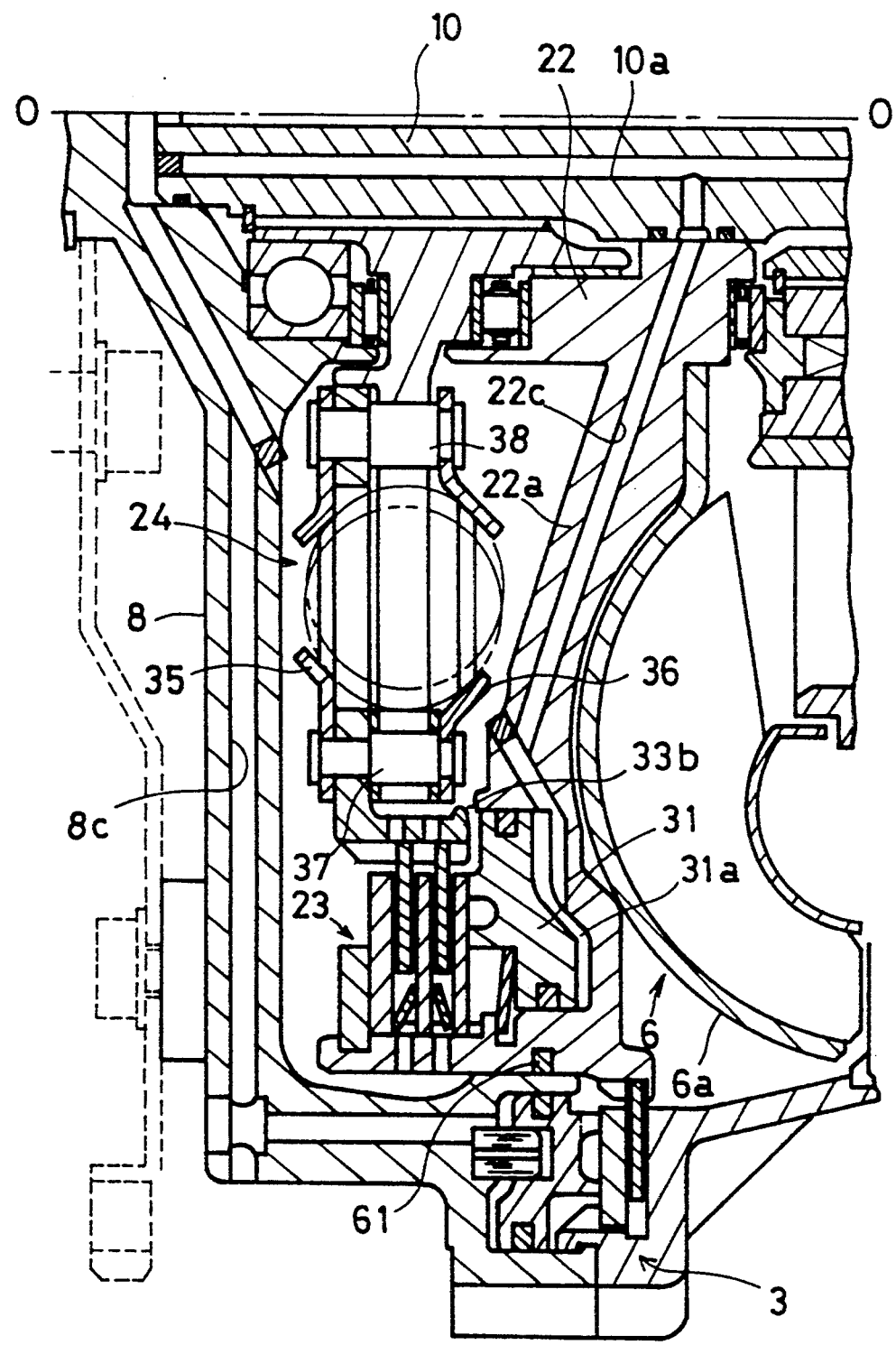
FIG. 4 is an enlarged partial view of FIG. 1.

As shown in FIG. 4, a fluid passage 22c by which the fluid passages 10a and a fluid chamber 31a disposed on the rear surface of a first piston 31 communicate with each other is further provided in the hub 22 including the flange 22a. In addition, the flange 22a is smoothly curved along the rear surface of the shell 6a. As a result, lubricating fluid coming out of the hole 22f is smoothly introduced radially outward and toward the engine (the left of FIG. 4) along the wall surface 22e of the flange 22a.

As shown in FIG. 3, the clutching portion 23 of the power disconnecting clutch 2 is mainly composed of annular first plates 25, 26 and 27 provided on the side of the radially inner portion of the cylindrical portion 22b, and annular second plates 28 and 29 provided on the side of the damper connecting part 24, and an annular first piston 31 for pressing both the first and second plates against each other. The radially outer portions of the first plates 25, 26 and 27 are spline fitted into the inner surface of the cylindrical portion 22 and are movable in the axial direction. In addition, the movement in the axial direction of the first plates 25, 26 and 27 is limited by retaining rings 30 and 50 fixed to the inner surface of the cylindrical portion 22b. On the other hand, the second plate 28 is disposed between the first plates 25 and 26, and the second plate 29 is disposed between the first plates 26 and 27. Annual facing members are attached to both surfaces of each of the second plates 28 and 29.

First washer-type conical springs 44 and 45 are disposed radially outward of the second plates 28 and 29 among the first plates 25, 26 and 27, that is, between the first plates 25 and 26, and between the first plates 26 and 27, respectively. Sufficient clearances are respectively ensured between the first plates 25 and 26 and between the first plates 26 and 27 by the first washer-type conical springs 44 and 45 at the time of disengaging the clutch. The two first washer-type conical springs 44 and 45 are set to the same in size and spring constant. Accordingly, the first plate 26 in the center is located in the center between the other first plates 25 and 27 on both sides of the first plate 26. In addition, the radially outer portions of the first washer-type conical springs 44 and 45 have a spline structure engaging with a spline of the cylindrical portion 22b. A clearance through which lubricating fluid can pass is formed between the spline in the radially outer portions of the first washer-type conical springs 44 and 45 and, the spline of the cylindrical portion 22b.

Holes 22d are formed with circumferential spacing in a plurality of places between the first plates 25 and 27 in the cylindrical portion 22b.

Furthermore, the cylindrical portion 8a of the front cover 8 provided radially outward of the holes 22d has on its inner wall surface a recession 8d concaved outward in the radial direction, and a plurality of discharge holes 8b are formed in the recession 8d. Specifically, lubricating fluid supplied among the first plates 25, 26 and 27 and lubricating fluid within the space A are discharged outward through the discharge holes 8b. That is, the lubricating fluid within the space A is moved radially outward by centrifugal force and is concentrated once in the recession 8d on the inner wall surface of the cylindrical portion 8b and then, is efficiently discharged through the discharge holes 8b.

The first piston 31 is disposed between the first plate 27 and the flange 22a. The first piston 31 is pressed against the flange 22a by a second washer-type conical spring 99. The first piston 31 is moved toward the left of FIG. by hydraulic operating fluid supplied from the fluid passage 22c (see FIG. 4) formed in the flange 22a, to connect the first plates 25, 26 and 27 with the second plates 28 and 29.

As shown in FIG. 2, the damper connecting part 24 is mainly composed of a driven hub 32, a driven plate 33, and torsion springs 34. The driven hub 32 has in radially inner portion a spline 32a spline fitted to the main drive shaft 10. The driven hub 32 has a flange extending radially outward. The flange of the driven hub 32 and the driven plate 33 are connected to each other elastically in the circumferential direction by the torsion springs 34 disposed in window holes extending in the circumferential direction formed in the driven hub 32 and the driven plate 33. The torsion springs 34 are held by disk-shaped retaining plates 35 and 36 so as not to come off both the window holes. The retaining plates 35 and 36 are fixed to the driven plate 33 by a plurality of stud pins 37 and 38 in their radially outer and inner portions. A long hole extending in the circumferential direction is formed in portions through which the stud pins 37 and 38 pass in the driven hub 32. Consequently, the rotation of the driven plate 33 relative to the driven hub 32 is allowed.

As shown in FIG. 3, a cylindrical engaging portion 33a extending toward the torque convertor body 1 is integrally formed in the radially outer end of the driven plate 33. A spline engaging with the radially inner ends of the above described second plates 28 and 29 so as to be movable only in the axial direction is formed on the outer surface of the engaging portion 33a. In addition, a plurality of radially penetrating through holes 33c are formed in the engaging portion 33a. An annular projection 33b projecting radially inward is formed in an axial end of the engaging portion 33a. As a result, lubricating fluid introduced into the engaging portion 33a is dammed up by the projection 33b and is efficiently supplied to the clutching portion 23 through the through holes 33c. The wall surface 22e of the flange 22a of the hub 22 is projected toward the engaging portion 33b and close thereto so as to efficiently supply the lubricating fluid to the engaging portion 33b.

Meanwhile, the discharge holes 8b in the front cover 8, the holes 22d in the cylindrical portion 22b, and the through holes 33c in the engaging portion 33a are formed in approximately the same position in the axial direction.

Description is now made of the lock-up clutch 3. As shown in FIG. 1, the lock-up clutch 3 contributes to the decrease in the axial length of the entire torque convertor because it is disposed out of the radial length of a torus comprising the impeller 5, the turbine 6 and the stator 7, and is disposed within the axial length including the torque convertor body 1 and the power disconnecting clutch 2.

As shown in detail in FIG. 3, the lock-up clutch 3 is mainly composed of an annular second piston 41 provided in the front cover 8 so as to be movable in the axial direction, an annular third plate 42 having its radially outer end engaging with the flange member 8g so as to be movable in the axial direction and relatively non-rotatable and pressed by the second piston 41, and an annular fourth plate 43 having radially inner end engaging with the cylindrical portion 22b so as to be movable in the axial direction and relatively non-rotatable, and disposed between the third plate 42 and the annular disk portion 8h of the flange member 8g. Annular friction members adhere to both surfaces of the fourth plate 43. Locking members 46 are disposed between the second piston 41 and the front cover 8. When hydraulic operating fluid is supplied from the fluid passage 8c (see FIG. 4) provided in the front cover 8, the second piston 41 is moved toward the right of FIG. 3, to press the third plate 42 and the fourth plate 43.

Figure 5:
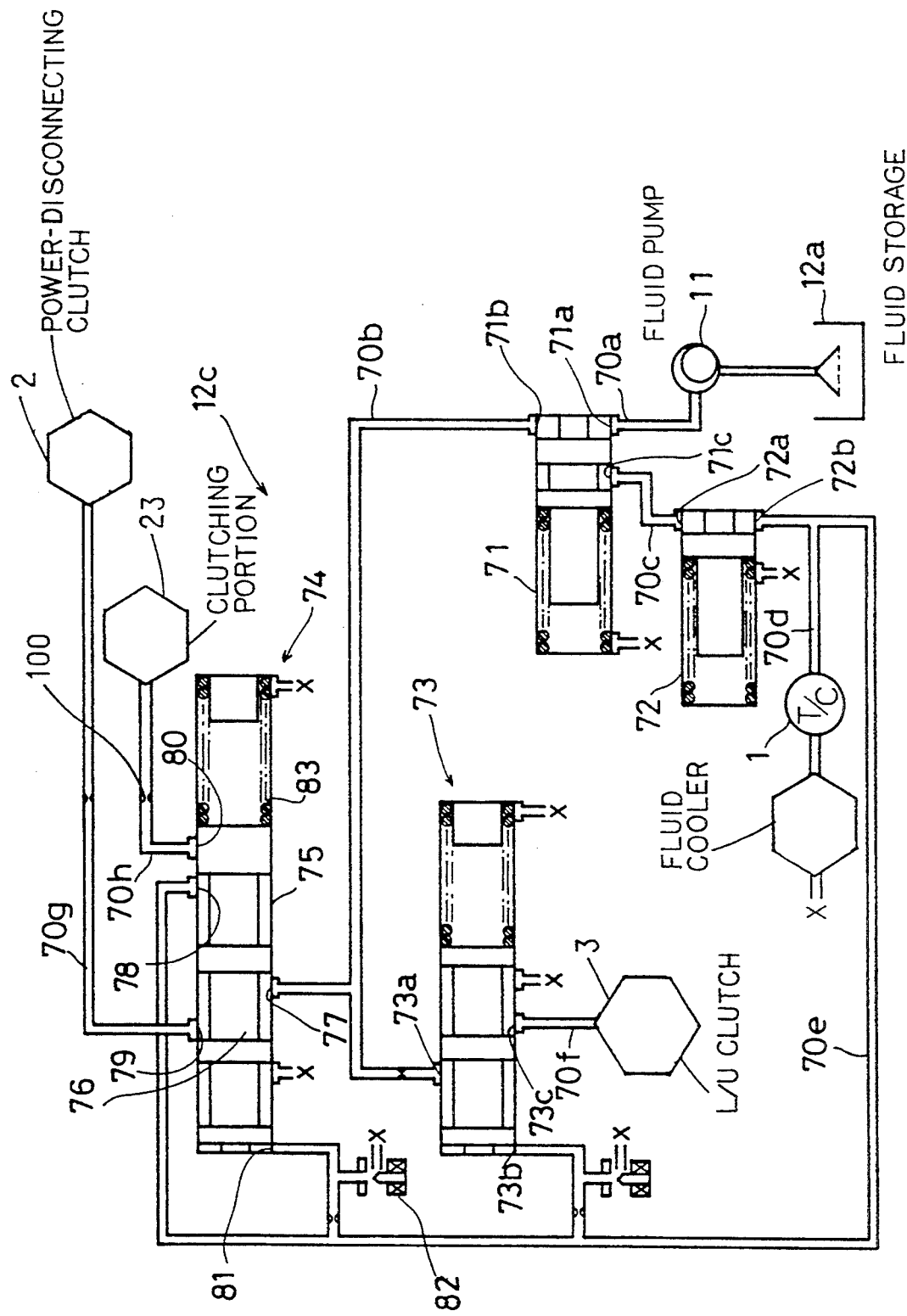
FIG. 5 is a schematic diagram of a hydraulic circuit, illustrating a directional control valve wherein a spool thereof is located in a first position.

FIG. 5 is a circuit diagram showing the control valve 12c.

The control 12c comprises first and second pressure control valves 71 and 72 disposed between the fluid pump 11 and the torque convertor body 1, a first control valve 73 for controlling the supply of hydraulic fluid to the lock up clutch 3, and a second-control valve 74 (directional control valve) for controlling the supply of hydraulic fluid for lubrication to the clutching portion 23 of the power disconnecting clutch 2. The second control valve 74 also controls the supply of hydraulic fluid for operation to the power disconnecting clutch 2. The second control valve 74 is mainly composed of a cylinder 75 and a spool 76 located within the cylinder 75 so as to be movable. The cylinder 75 is formed with a first input port 77, a second input port 78, a first output port 79, a second output port 80 and a control port 81. The first output port 79 is connected to the fluid chamber 31a of the power disconnecting clutch 2 through an fluid passage 70g, and the second output port 80 is connected to the clutching portion 23 through a fluid passage 70h. The fluid passage 70h is provided with a throttle 100.

The first pressure control valve 71 is provided with an input port 71a to which the fluid pump 11 is connected through a fluid passage 70a, a first output port 71b which is connected to an input port 73a of the first control valve 73 and a first input port 77 of the second control valve 74 through a fluid passage 70b, and a second output port 71c which is connected to the input port 72a of the second pressure control valve 72 through a fluid passage 70c. An output port 72b of the second pressure control valve 72 is connected, through a fluid passage 70e, to the torque convertor body 1 through a fluid passage 70d, and to a control port 73b of the first control valve 73, the control port 81 of the second control valve 74 and the second input port 78 of the second control valve 74. An output port 73c of the first control valve 73 is connected to the lock-up clutch 3 through a fluid passage 70f.

A solenoid valve 82 is provided between the fluid passage 70e and the control port 81 of the second control valve 74. In FIG. 5, the solenoid valve 82 is shown not activated, wherein no hydraulic fluid flows into the control port 81. Consequently, the spool 76 is retained in a first position by a return spring 83. In this state, the first input port 77 communicates with the first output port 79 so that the hydraulic fluid for clutch operation is supplied to the power disconnecting clutch 2. In the situation of FIG. 5, the second input port 78 does not communicate with the second output port 80, wherein hydraulic fluid for lubrication is not supplied to the clutching portion 23.

According to the present embodiment described in the foregoing, the torque convertor body 1 and the power disconnecting clutch 2 are contained in the housing 9, and the fluid pump 11, the tank 12a and the control valve 12c are fixed to the housing 9 and formed as a unit. Therefore, in a vehicle comprising a conventional manual clutch it is possible to convert the manual power transmission to a semi-automatic power transmission without difficulty merely by replacing the clutch housing with a unit according to the present invention.

Operation

If power is transmitted to the front cover 8 from the engine side, the impeller 5, along with the front cover 8, is rotated, and the turbine 6 is further rotated through hydraulic fluid. The rotation of the turbine 6 is transmitted to the main drive shaft 10 through the hub 22 and the flange 22a, the clutching portion 23, and the damper connecting part 24.

Furthermore, when the impeller 5 is rotated, the fluid pump gear 47 fixed to the impeller 5 is driven. As a result, the fluid pump 11 1s driven, so that hydraulic fluid stored in the tank 12a is sucked and is supplied as hydraulic fluid for operation and for lubrication to predetermined places through the fluid passages 10a in the main drive shaft 10 by the control valve 12c.

As indicated by an arrow in FIG. 2, the hydraulic fluid for lubrication supplied from the fluid passages 10a is supplied to the space A where the power disconnecting clutch 2 is disposed through the fluid passage 22f. The hydraulic fluid supplied to this space A is moved radially outward by centrifugal force. At this time, as shown in an enlarged manner in FIG. 3, the hydraulic fluid is supplied to the engaging portion 33a smoothly along the wall surface 22e of the flange 22a. In this case, dispersion is prevented by the projection 33b. Accordingly, the hydraulic fluid is efficiently supplied to the clutching portion 23 through the through holes 33c, to lubricate the first plates 25, 26 and 27 and the second plates 28 and 29. In addition, the hydraulic fluid passes through the holes 22d from the spline fitted portions of the first washer-type conical springs 44 and 45 and is concentrated in the recession 8d on the inner wall surface of the cylindrical portion 8a. In addition, the other hydraulic fluid in the space A is also moved radially outward by centrifugal force and is similarly concentrated in the recession 8d on the inner wall surface of the cylindrical portion 8a. The hydraulic fluid concentrated is discharged outward from the space A through the discharge holes 8b. The hydraulic fluid discharged outward is moved downward, to be stored in the tank 12a.

In this case, it is the seal ring 61 that prevents the hydraulic operating fluid in the torque convertor body 1 from flowing into the space A where the power disconnecting clutch 2 is disposed. Accordingly, the supply and the discharge of the hydraulic fluid for lubrication can be accurately controlled. Consequently, the hydraulic fluid is smoothly and efficiently supplied to the clutching portion 23, and it can be discharged quickly and efficiently. Accordingly, It is possible to reliably supply a required amount of hydraulic fluid when required, to reduce drag torque generated between the second plates 28 and 29 and the first plates 25, 26 and 27 when the power disconnecting clutch 2 is disengaged.

Moreover, at the time of disengaging the power disconnecting clutch 2, the first washer-type conical springs 44 and 45 separate the first plates 25 to 27 from one another, to maintain predetermined clearances among the first plates 25 to 27. Consequently, it is possible to further reduce the drag torque generated by the power disconnecting clutch 2.

Furthermore, at the time of engaging the power disconnecting clutch, the first washer-type conical springs 44 and 45, along with the second washer-type conical spring 30, are elastically deformed. Therefore, a shock at the time of engaging the clutch is absorbed. In addition, a shock occurring at the time of engagement is absorbed by the torsion springs 34, thereby to make it difficult to transmit the shock to the main drive shaft 10.

Next, operation of the control valve 12c will be explained.

Referring to FIG. 5, wherein the solenoid valve 82 is shown not activated, in this case, the hydraulic fluid introduced into the control port 81 is almost nil, such that the spool 76 is positioned in the first position shown in FIG. 5 by the return spring 83. As a result, the first input port 77 communicates with the first output port 79 and the second output port 80 is shut off from the input ports 77 and 78 by lands of the spool 76. The hydraulic fluid for clutch operation is sent to the fluid chamber 31a of the power disconnecting clutch 2 and the hydraulic fluid for lubrication is not sent to the clutching portion 23.

When the operator wants to change speed by operating the manual transmission, he activates the solenoid valve 82. Then, the hydraulic fluid is supplied to the control port 81 from the fluid passage 70e. As a result, the first output port 79 and the first input port 77 are shut off from each other so that the hydraulic fluid supplied to the fluid chamber 31 of the power disconnecting clutch 2 is drained, whereby the power disconnecting clutch 2 is released. Since the hydraulic fluid for lubrication is not supplied in an instance of the clutch release, the drag torque is reduced. Communication between the second input port 78 and the second output port 80 starts supplying the hydraulic fluid for lubrication to the clutching portion 23. The amount of the hydraulic fluid for lubrication is adjusted by the throttle 100 provided in the fluid passage 70h and so on such that the amount is just enough for lubrication, thereby reducing drag torque. When the solenoid valve 82 is deactivated, the hydraulic fluid is drained from the control port 81 so that the spool 76 is moved to the first position shown in FIG. 5 by the return spring 83. Consequently, the hydraulic fluid for clutch operation is supplied to the fluid chamber 31a of the power disconnecting clutch 2 to engage the clutch. At the clutch engagement, enough amount of the hydraulic fluid for lubrication is already supplied to the clutching portion 23.

Since hydraulic fluid for lubrication is supplied to the clutching portion 23 only when it is required, the amount of hydraulic fluid for lubrication is minimized; meanwhile a sufficient amount of the hydraulic fluid is supplied to the fluid chamber in the torque convertor body 1.

The structure of the control valve 12c as described in foregoing renders the conventionally complex structure of fluid passages for lubrication unnecessary.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A directional control valve for supplying hydraulic fluid via a fluid pump to a power-disconnecting hydraulic clutch which engages and releases an input member and an output member of a torque convertor, comprising:
   a cylinder having
   a fluid inlet and a control port which pass hydraulic fluid in supply from a fluid pump,
   a first output port for supplying hydraulic fluid for clutch operation to said hydraulic clutch, and
   a second output port for supplying hydraulic fluid for clutch lubrication to said hydraulic clutch; and
   a spool slidably disposed within said cylinder, shiftable, according to pressure of the hydraulic fluid supplied via said control port, between a first valve position, wherein said fluid inlet and said first output port are communicated, and a second valve position, wherein said fluid inlet and said second output port are communicated.

2. A directional control valve according to claim 1, further comprising an urging member for elastically urging said spool in sliding within said cylinder.

3. A directional control valve according to claim 2, wherein said urging member positions said spool in one of said valve positions wherein hydraulic fluid pressure is not supplied via said control port.

4. A control valve system for supplying hydraulic fluid from a fluid pump to a power-disconnecting hydraulic clutch which engages and releases an input member and an output member of a torque convertor;

the control valve system including a pressure control valve having an input port connected to said fluid pump, and a directional control valve connected to said pressure control valve; wherein said directional control valve comprises:

a cylinder having a fluid inlet and a control port connected to an output port of said pressure control valve; a first directional control valve output port for supplying hydraulic fluid for clutch operation to a hydraulic clutch, and a second directional control valve output port for supplying hydraulic fluid for clutch lubrication to said hydraulic clutch; and a spool slidably disposed within said cylinder, shiftable, according to pressure of the hydraulic fluid supplied via said control port, between a first valve position, wherein said fluid inlet and said first output port are communicated, and a second valve position, wherein said fluid inlet and said second output port are communicated.

5. A control valve system according to claim 4, further comprising a valve for controlling supply of hydraulic fluid from said pressure control valve to said control port of said directional control valve.

6. A control valve system according to claim 5, wherein said directional control valve further includes an urging member for elastically urging said spool in sliding relationship within said cylinder.

7. A control valve system according to claim 6, wherein positioning of said spool is determined by said urging member to be in one of said valve positions wherein the hydraulic fluid supply control valve shuts off hydraulic fluid supply to said directional control valve; and said spool is driven by hydraulic fluid pressure into the other of said valve positions wherein said hydraulic fluid supply control valve allows hydraulic fluid supply to said directional control valve.

8. A control valve system according to claim 7, wherein said fluid inlet of said cylinder is divided into a first input port and a second input port; said positioning of said spool being such that wherein said spool is in said first position, said first input port and said first directional control valve output port are communicated, and said second directional control valve output port is not in communication with the first and second input ports; and wherein said spool is in said second position, said second input port and said second directional control valve output port are communicated, and said first directional control valve output port is not in communication with said first and second input ports.

9. A control valve system according to claim 8, further comprising a fluid passage located between said second directional control valve output port and a clutching portion of said power-disconnecting hydraulic clutch, said fluid passage being formed to include a throttle.

10. In a power transmission coupling transmitting power from an engine to a transmission, including a torque convertor connectable to an input-side rotation member toward said engine and supplied with hydraulic fluid in operation to transmit power, a power-disconnecting clutch for transmitting and disconnecting power between said torque convertor and said transmission, a fluid storage for storing hydraulic fluid for supply to said torque convertor and said power-disconnecting hydraulic clutch, and a fluid pump for pumping out the hydraulic fluid in said fluid storage, a torque convertor clutch fluid regulator for controlling hydraulic fluid flow from said fluid pump in supply of said hydraulic fluid to said torque convertor and said power-disconnecting hydraulic clutch; said fluid regulator comprising:

a directional control valve including a cylinder having a fluid inlet and a control port which pass hydraulic fluid in supply from said fluid pump; a first output port for supplying hydraulic fluid for clutch operation to said hydraulic clutch, and a second output port for supplying the hydraulic fluid for lubrication to said hydraulic clutch; and a spool slidably disposed within said cylinder, shiftable, according to pressure of the hydraulic fluid supplied via said control port, between a first valve position, wherein said fluid inlet and said first output port are communicated, and a second valve position, wherein said fluid inlet and said second output port are communicated.

11. A torque convertor clutch fluid regulator according to claim 10, wherein a fluid passage for transmitting hydraulic fluid from said control valve to said torque convertor and said power-disconnecting clutch is formed in a main drive shaft extending from said transmission and connected to said power-disconnecting clutch.

12. A torque convertor clutch fluid regulator according to claim 11, wherein said power-disconnecting clutch comprises:

a drive-side member connected to said torque convertor;

a driven-side member for connection to said main drive shaft;

a clutching portion for connecting said drive-side member to, and disconnecting it from, said driven-side member; said clutching portion including a plurality of axially movable plates for engagement with said drive-side member and said driven-side member, and a pressing means for pressing said plurality of plates together; and an elastic connecting means for elastically connecting said driven-side member and said main drive shaft.

13. A torque convertor clutch fluid regulator according to claim 12, said power transmission coupling further comprising a front cover connected to said input-side rotation member; wherein said torque convertor includes an impeller connected to said front cover and a turbine disposed opposite said impeller;

said drive-side member is fixed to a dorsal surface of said turbine, and said clutching portion is disposed radially outward of said drive-side member; and said drive-side member is configured to have a wall surface for introducing hydraulic fluid into said clutching portion, supplied for lubrication from said fluid passage to a radially inner portion of said drive-side member.

14. A torque convertor clutch fluid regulator according to claim 13, wherein said drive-side member is composed by a hub; a flange, bearing said wall surface, extending radially outward from said hub and fixed to said dorsal surface of said turbine; and a first cylindrical extension extending axially from a circumferential periphery of said flange;

said driven-side member is a disk-shaped plate having along a circumferential periphery thereof a second cylindrical extension extending axially; and in the engagement of the plurality of plates with said first cylindrical extension and said second cylindrical extension as the drive-side and driven-side members, said plates are axially movable and cannot rotate relative to the cylindrical extensions.

15. A torque convertor clutch fluid regulator according to claim 14, wherein the first and second cylindrical extensions are formed to have radially penetrating holes.

16. A torque convertor clutch fluid regulator according to claim 15, wherein said hub is formed to have a hole via which hydraulic fluid can flow radially outward; and said wall surface of said flange is formed so as to introduce hydraulic fluid for lubrication in flow from said hole toward a radially inner surface of said second cylindrical extension.

17. A torque convertor clutch fluid regulator according to claim 16, wherein an annular projection extending radially inward is formed along a rim of said second cylindrical extension.

18. A power transmission device according to claim 17, further comprising a housing containing said torque convertor and said power-disconnecting clutch; wherein said fluid storage is disposed in said housing;

said fluid pump is fixed to said housing; and said control valve is disposed within said housing.

* * * * *